CHRISTOPHER JOHN LAKE (NAME CHANGED FROM JOHN CHRISTOPHER LAKE BY JUDICIAL ORDER).
AERIAL NAVIGATION.
APPLICATION FILED DEC. 18, 1907.
918,336.
Patented Apr. 13, 1909.
5 SHEETS—SHEET 1.
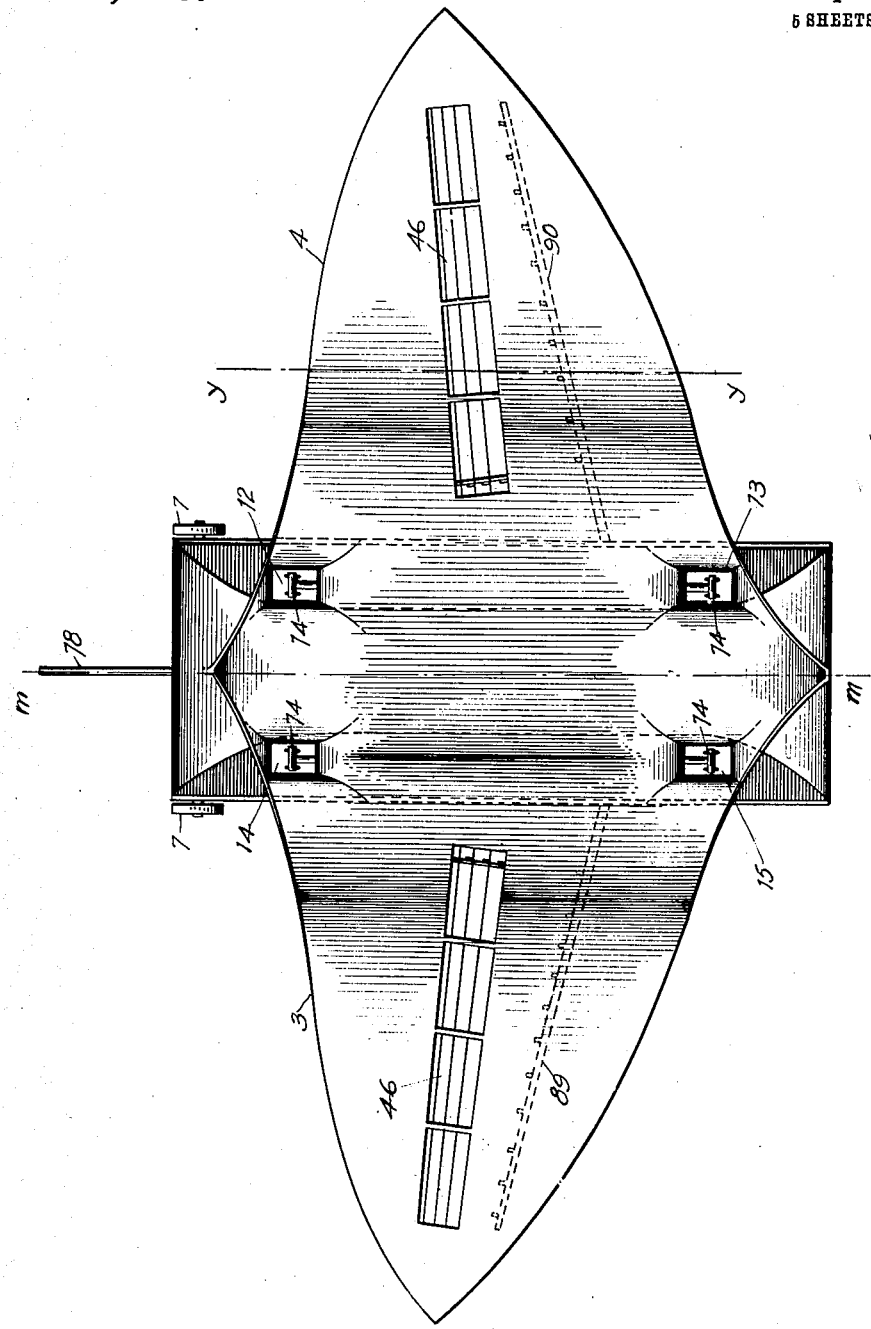

CHRISTOPHER JOHN LAKE (NAME CHANGED FROM JOHN CHRISTOPHER LAKE BY JUDICIAL ORDER).
AERIAL NAVIGATION.
APPLICATION FILED DEC. 18, 1907.
918,336.
Patented Apr. 13, 1909.
5 SHEETS—SHEET 2.
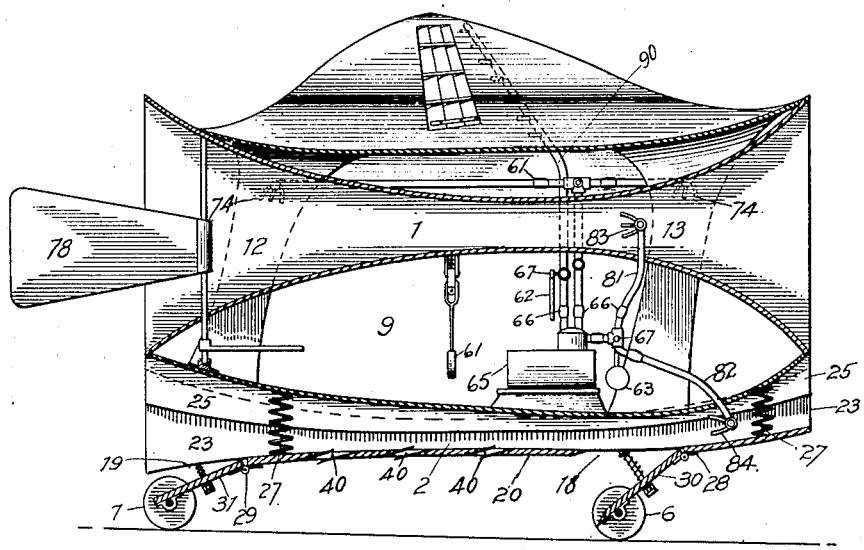
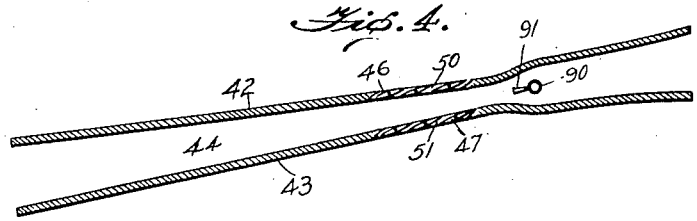

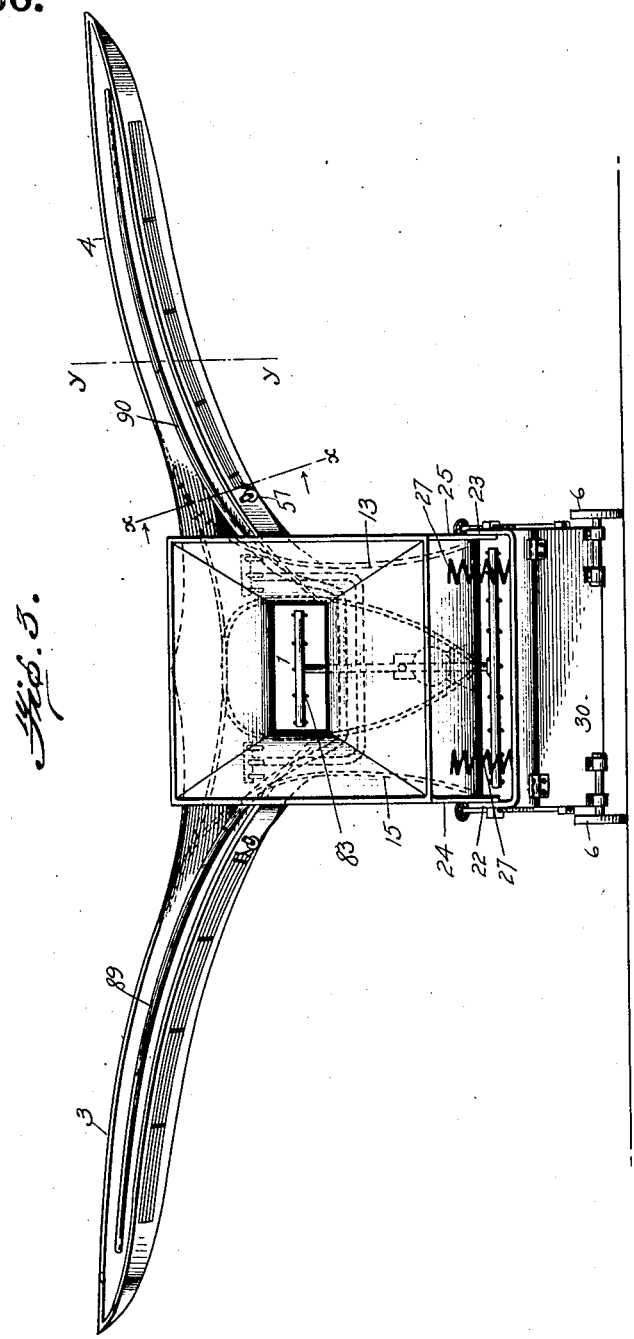

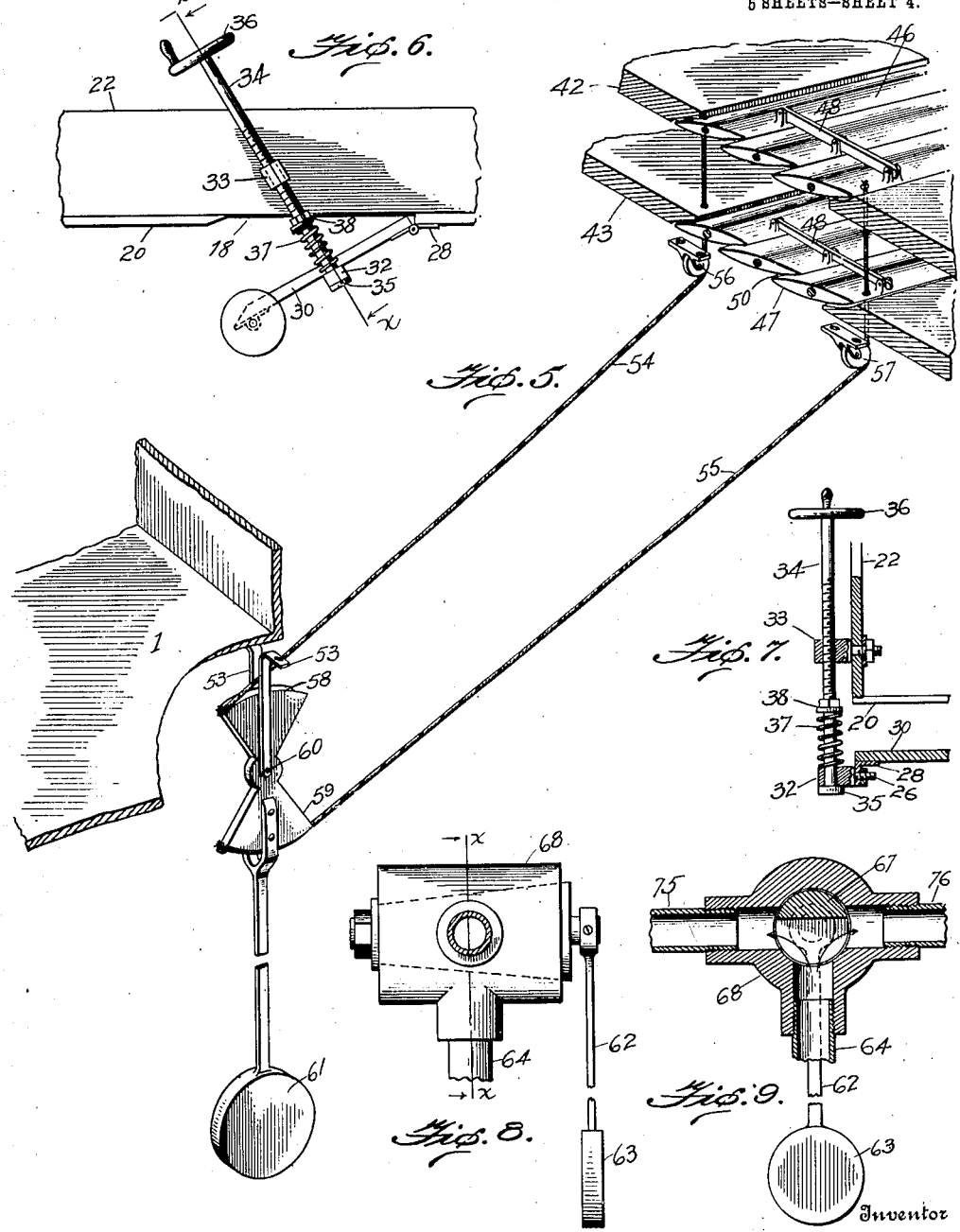

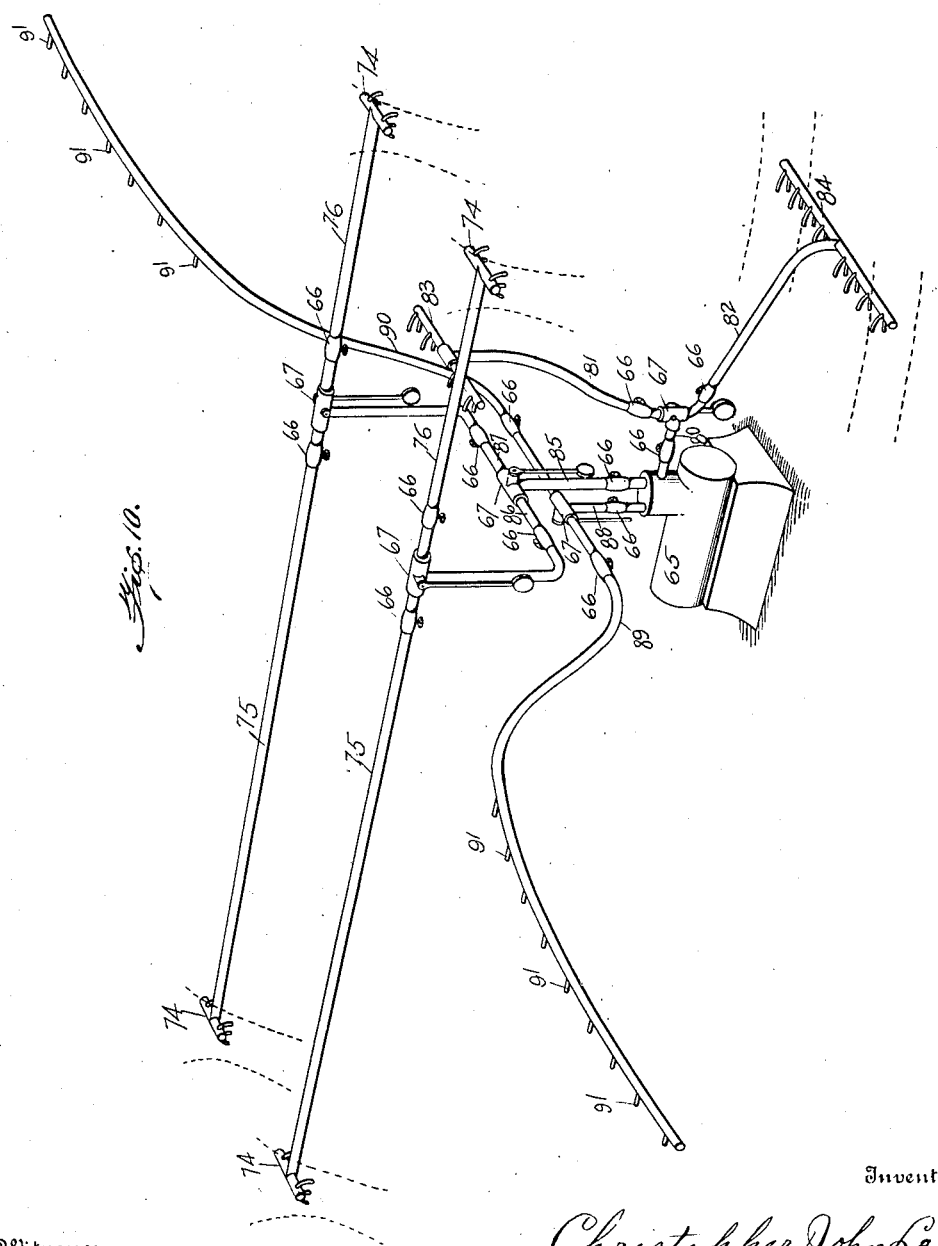

UNITED STATES PATENT OFFICE.

CHRISTOPHER JOHN LAKE, (NAME CHANGED FROM JOHN CHRISTOPHER LAKE BY JUDICIAL ORDER,) OF BRIDGEPORT, CONNECTICUT.

AERIAL NAVIGATION.

No. 918,336.  Specification of Letters Patent.  Patented April 13, 1909.

Application filed December 18, 1907. Serial No. 407,094.

*To all whom it may concern:*

Be it known that I, CHRISTOPHER JOHN LAKE, (formerly JOHN CHRISTOPHER LAKE,) a citizen of the United States, and a resident of Bridgeport, in the county of Fairfield and State of Connecticut, have invented certain new and useful Improvements in Aerial Navigation, of which the following is a specification.

My invention relates primarily to the propulsion and operation of vessels for aerial navigation, but it is adapted also for use in traveling on the land or over the surface of water or ice as may be desired, and for starting on or landing from an aerial flight, or when the vessel is so loaded as to render it impracticable to rise wholly in the air.

One object of my invention is to provide for the propulsion of aerial or other vessels without resort to balloons for buoyancy and with less resistances to overcome than attends the usual methods of propulsion.

A further object is to provide effective means for preserving or restoring the equilibrium of the vessel when entirely in the air.

A further object is to provide means for generating and applying heat force in the form of steam or other heated elastic fluid direct and impulsively to the air immediately adjacent the vessel in such manner as to overcome the effect of gravity and of wind or air currents.

A further object is to so apply the generated force that while lifting or propelling the vessel it will also tend to create a vacuum immediately above and ahead of the vessel.

A further object is to provide for the transference of the energy of the steam or other fluid issuing from the vessel into a relatively large volume of air drawn from above or ahead of the vessel and concentrated at the point of contact with the power fluid so as to absorb the energy thereof and issue in greatly expanded volume below or behind the vessel, so as to support the vessel and to drive it forward.

With the above objects in view and other objects which will appear as the nature of my invention is more fully disclosed, I have invented the vessel or vehicle, one form of which is illustrated on the accompanying drawings forming a part of this specification, and in which, Figure 1 is a top plan view. Fig. 2 is a longitudinal section on line $m$—$m$ of Fig. 1. Fig. 3 is a front end elevation. Fig. 4 is a large scale longitudinal wing section on line $y$—$y$ of Figs. 1 and 3. Fig. 5 is a large scale detail of a portion of the pivoted leaves in the wings and means for operating them. Fig. 6 is a detail side view of mechanism for adjusting the position of the wheels shown in Figs. 2 and 3. Fig. 7 is a section on line $x$—$x$ of Fig. 6. Fig. 8 is an outside view of the regulating valve and pendulum attachment for varying the flow of power fluid. Fig. 9 is a sectional view on line $x$—$x$ of Fig. 8. Fig. 10 is a skeleton view of the power fluid distributing system of the vessel.

Similar reference characters are used to designate corresponding parts throughout the several views.

The body or main portion of the vessel is formed of the substantially horizontal upper and lower passages or conduits 1 and 2 to the upper of which are attached the hollow wings 3 and 4, and the lower of which forms by its under side the body or hull for water navigation and carries the wheels 6 and 7, for land travel. The upper and lower conduits are rectangular in section and are contracted throughout their central portions intermediate their expanded open ends at which portions they are attached to each other leaving the space 9 which provides room for operating machinery, passengers etc., on top of the lower passage, and which is shown open for purposes of illustration, but may be inclosed in actual practice. The upper passage is contracted in its horizontal as well as its vertical dimensions while the lower one is not contracted except in a vertical direction. This provides space for the centrally contracted vertical passages 12, 13, 14, and 15 adjacent the upper passage 1, and leading from above the vessel down to the lower passage 2 which is provided with the closable apertures 18 and 19 in its lower side 20, in alinement with the vertical passages.

The under body or lower portion 21 of the passage 2 is not secured rigidly to its upper portion, but is provided with the upturned sides 22 and 23 telescoping outside of corresponding down-turned sides 24 and 25 on the upper portion. The connection between the upper and lower portions of the passage is made flexible or elastic by means of spiral or helical springs 27; the telescoping sides prevent lateral displacement between the two portions and any suitable form of guides or the like may be used to secure them longitudinally.

The aprons 30 and 31 are secured to the under body by the hinges 28 and 29. They close the apertures 18 and 19 and carry on their lower portions the wheels 6 and 7. The angle of these aprons and with it the position of the wheels is controlled by the screw and spring mechanism arranged on opposite sides of each apron and shown in detail in Figs. 6 and 7. The pivoted collar or eye 32 is connected to the side of the apron by the pivot 26 passing through the bracket 28 and the nut 33 is similarly connected to the upturned side 22. A screw 34 having a head 35 is passed through the eye 32, screwed up through the nut 33 and provided with the hand-wheel 36. A stout helical spring 37 is arranged on the unthreaded portion of the bolt between the pivoted eye 32 and the nut or washer 38 which keeps the spring in position. By turning the hand-wheel the eye 32, and with it the apron and wheels may be adjusted so as to open the aperture 18 and depress the wheels or close the aperture and elevate the wheels, and in any open position the wheels will be capable of compression toward the under body 20 against the resistance of the springs 37 which thus provide for smoothness of travel on the land as well as over rough waters or uneven ice. The screw and spring mechanism is attached to both aprons 30 and 31. It is illustrated as though operated independently on opposite sides of the aprons, but it is obvious that they can be geared together so as to operate by means of one hand-wheel or other device.

In addition to the closable openings 18 and 19 the under body is provided with a series of slant openings 40, the purpose of which will later appear.

The wings 3 and 4 are of double thickness comprising the upper and lower planes or curved surfaces 42 and 43 with a space between as shown in section by Fig. 4. The upper planes 42 are continuous across the top of the vessel for both wings, but in their fore and after portions they merge smoothly into the upper expanded ends of the vertical passages 12, 13, 14 and 15. Each of the lower wing planes 43 curves downwardly and joins the sides of the upper longitudinal passage 1. The upper and lower planes are so disposed in relation to each other that they form fore and aft centrally contracted wing passages 44, a typical section of which is shown in Fig. 4. The upper and lower wing planes are each provided with a series of pivoted leaves 46 and 47 so linked together by the bars 48 that they will form continuous surfaces or may be turned to form the slant openings 50 and 51 as shown. Cords or wires afford means for adjusting the leaves, which may be operated manually or by an automatic device such as that illustrated in Fig. 5 which shows also a part wing section on the line x—x of Fig. 3. The cords or wires 54 and 55 are secured to one of the leaves in each series and pass over pulleys 56 and 57 attached to the under side of the wing. The other ends of the cords are secured to the grooved quadrants 58 and 59 arranged above and below the fulcrum 60 of the pendulum 61 secured to the lower side of the passage 1 by the hangers 53. The cord 54 which opens the leaves is attached in the groove of the upper quadrant and the one that closes them is fastened to the lower. A detail of this arrangement as shown in Fig. 5 is applied to the left wing 4. And this is duplicated on the opposite side for the wing 3. The two independent pendulums obey the same tendencies to swing so that any action in one wing is attended by the opposite action in the other, but the pendulums may be swung by hand in any manner desired. Any lateral inclination of the vessel causes relative movement of the pendulums toward the side depressed. This movement draws on the cord 54 and pays out the cord 55, thus opening the leaves to form slant openings through which air is drawn from above the wing and expelled below, the effect of which is to elevate the wing and restore the vessel's equilibrium. In the device shown a pendulum alone is used for operating the cords but a gyroscope can be used for the same purpose either as a substitute for the pendulum or in conjunction therewith, the gyroscope having its axis in the plane through which the pendulum swings and preferably passing through its center of arc.

The generator 65 supplies a heated elastic fluid to furnish power for the entire vessel. The fluid is conducted to its several points of application by the system of pipes shown in Fig. 10. These pipes are provided with cut-off valves 66 and regulating valves 67 to govern the flow. A detail of the regulating valve is shown in Figs. 7 and 8. It is placed at the intersection of branch pipes leading to opposite portions of the vessel for the purpose of varying the relative quantity of flow on the opposite sides and may be operated either by hand or by automatic means. The regulating valve 67 is formed of a plug having about half its thickness cut away in its middle. The plug is fitted in a valve chamber 68 threaded for the inlet pipe 64 and the two outlets 75 and 76. The handle 62 of the plug hangs downwardly and provides means for turning it. The handle carries a pendulum 63 so adjusted that the valve will be operated by its swing. Normally all the passages in the valve chamber are open and the position of the plug is such that a slight turning movement will increase the opening to one outlet and diminish the opening to the other. The pipe 80 leads from the generator to one of these valves and the branches 81 and 82 conduct the fluid to the projectors 83 and 84 in the upper and lower longitudinal passages respectively. The pipe 85 leads from the generator to a regulating valve and the branches 86 and 87 conduct the fluid to opposite sides of the vessel to supply the projectors in the vertical passages. Each of the branches 86 and 87 leads in turn to another regulating valve controlling branches 75 and 76 on each side of the vessel which supply the projectors 74 in the forward and after vertical passages 12 and 13 and 14 and 15. The pipe 88 conducts fluid to the branch pipes 89 and 90 having a regulating valve at their intersection and leading to the interior of the wings on either side where the fluid is discharged through a series of projectors 91 located forward of the adjustable leaves 46 and 47. The function of all of the projectors is the same, namely, to discharge the power fluid through the passages in which they are placed in such manner as to draw air from in front and above the passage and discharge it behind or below with greatly increased volume and energy. This produces a tendency toward vacuum at one end of the passage and a strong reaction at the other, thus giving the vessel a tendency to move by the combined effect of attraction and propulsion.

I am aware that it is old to use a current of air through a passage and it is also old to use a jet of elastic fluid for propulsion. I have extended the prior art by utilizing the joint action of the fluid jet and the air current so that each is of special advantage to the other. The fluid jet heats and expands the air current as it passes through the passage and the air current, in turn, provides a constant abutment to receive the impact of the jet. These are important features, for it is well known that the efficiency of propulsion increases with the size of the current discharged and that a jet projected in "dead" or "slack" air at the rear of a vessel is of comparatively small value. In my invention "live" air is drawn in from in front of the vessel and concentrated to intimate contact with the jet which augments and expands the volume of air into the most efficient sternward stream. All these advantages come from the mere joint action of the jet and the air current, by whatever means they may be respectively produced. The invention comprises, however, the further valuable feature of combined means for producing the jet and the current of air, so that the jet not only heats and expands the air but actually produces the current as well.

The operation is as follows: Suppose the vessel to be standing on the wheels 6 and 7 and ready to start. If there is a good track the power fluid may be turned on in either or both the longitudinal passages and in the wings. The resulting forward motion will bring the wings and other plane surfaces into effect as aeroplanes and cause the vessel to rise, the desired inclination of the vessel being maintained by varying the relative propelling power in the upper and lower longitudinal passages and wings, and the steering being effected by varying the relative propelling power in the two wings. The arrangement of the passages in the wings and the propelling passages 1 and 2, one above the other makes it possible to control the inclination of the vessel by variations in the propelling force, the vessel being inclined downwardly when the greater propelling force is in the upper passages and being elevated in its forward part when the greater propelling force is applied through the lower passage. These variations may be produced by manipulation of the cut-off valves 66 but it is intended more especially to produce them by means of regulating valves 67 illustrated in detail in Figs. 7 and 8 where one of them is shown as connected with pipes 64, 75 and 76. Any of these valves may be operated either by hand or by the action of the pendulum which is shown. In the same way the application of a greater force through either of the wings will cause that side of the vessel to advance. Thus a means is provided for steering the vessel independently of the rudder 78, which may be omitted if desired. When the start is made upon water the apertures 18 and 19 are closed and the fluid discharged in the passages as before. Any water in the lower passage 2 is immediately discharged by the power fluid and air passing therethrough. Some of the power fluid and air enters the slant openings 40 and forming an air cushion between the water and the under body greatly reduces the frictional contact. These slant openings are shown fixed but it is obvious that they may be formed of pivoted leaves similar to those used in the wings if desired. When rough water is encountered the springs 27 come into play, and smoothness of action is further insured by the yielding pressure of air in the passage formed by the under body. When the conditions are such that a running start is not possible or not desired the vessel is launched into the air by means of power from the vertical passages 12, 13, 14, and 15. The apertures 18 and 19 are opened wide and full power turned on through the projectors 74. The atmosphere is thus drawn from above the vessel and the upper side of its wings and discharged with great force and volume below. This action lifts the vessel, giving it at the same time a slight forward tendency which may be increased by gradually bringing the longitudinal passages into play and diminishing the vertical action until the speed is sufficient to render the wings and other plane surfaces fully effective for support.

During the vertical launching of the vessel equilibrium is maintained by varying the supply of power fluid in the vertical projectors. This is effected either by manual operation of the valves in the pipes leading thereto or by the automatic controlling device previously described and illustrated in Figs. 7 and 8. If one part of the vessel rises more than another part it is only necessary to diminish the power applied to that part and increase it at the lower part, and this may be done automatically by a pendulum as 63 which, swinging always toward the lower part, opens the pipe leading to that part and closes the other. While a pendulum is shown in the drawings it is, of course, understood that a gyroscope may be added or substituted in the same manner as mentioned in connection with the device shown in Fig. 5. After being launched into the air the equilibrium of the vessel is maintained by varying the amount of power applied through the various passages, and the lateral stability is more especially secured also by the peculiar arrangement of leaves in the upper and lower wing planes which have been described. By this device the leaves may be open to form slant openings through which air will be drawn from above the wing by the power fluid and air passing therethrough. In this way more or less vacuum can be produced above either wing as may be required to restore the vessel's equilibrium. By the same action the leaves in either of the lower wing planes are opened and fluid discharged beneath the wing producing a pressure with the like effect as the vacuum that may be induced above. The opening and closing of the leaves may be performed either manually or automatically by the device which has been described and illustrated by Fig. 5.

Having now described one of the many forms in which my invention may be embodied, what I claim is;

1. In a vessel or vehicle, the combination of longitudinal air passages and substantially vertical air passages, each of said passages having a contracted central portion and expanding in either direction therefrom to enlarged open ends, means for producing a heated elastic fluid under pressure and means for discharging said fluid from points intermediate the ends of the conduits, and their contracted central portions in such manner as to impel air therethrough, the air being heated and expanded by said fluid during its traverse of the expanding portions of the conduits.

2. In a vessel or vehicle, the combination of laterally extending wings or aeroplanes, a longitudinal air passage and substantially vertical air passages, each of said passages having a contracted central portion and expanding in either direction therefrom to enlarged open ends, means for producing a heated elastic fluid under pressure and means for discharging said fluid from points intermediate the ends of the conduits and their contracted central portions in such manner as to impel air therethrough, the air being heated and expanded by said fluid during its traverse of the expanding portions of the conduits.

3. In a vessel or vehicle the combination of a longitudinal air passage having enlarged open ends and inclined openings intermediate the ends, means for generating a power fluid, and projectors for discharging the fluid longitudinally of said passage.

4. In a vessel or vehicle the combination of upper and lower parallel longitudinal air passages having enlarged open ends, means for generating a power fluid, projectors for discharging the fluid longitudinally of said passages, and means for controlling the flow of fluid through the projectors.

5. In a vessel or vehicle the combination of hollow wings or aeroplanes forming open longitudinal passages, said passages being contracted in their central portions, means for generating a power fluid, and projectors for discharging the fluid into and through said passages to propel the vessel from a point within the passages between their ends and their contracted portions.

6. In a vessel or vehicle the combination of a car or body, a compressibly and flexibly attached under body forming a longitudinal passage, means for generating a power fluid, and means for applying said fluid directly to air in the passage to cushion and propel the vessel.

7. A vessel or vehicle mounted on wheels and having wings extending from either side, a flexibly and compressibly attached underbody adapted to glide over liquid or frozen water, and means for generating and applying a power fluid impulsively to air to propel the vessel.

8. In a vessel or vehicle the combination of one or more substantially longitudinal air passages, and one or more substantially vertical air passages, all of said passages having enlarged open ends, and means for projecting a power fluid therein from a point within the passages between their ends and central portions.

9. In a vessel or vehicle the combination of one or more substantially longitudinal air passages, and one or more substantially vertical air passages, all of said passages having enlarged open ends, and means for projecting a power fluid therein from a point within the passages between their ends and central portions and wings or aeroplanes extending laterally from the sides of the vessel.

10. In a vessel or vehicle the combination with wings or aeroplanes of upper and lower longitudinal passages, means for producing an air current through each of said passages, and means for varying the relative flow through said passages so as to control the inclination of the vessel.

11. In a vessel or vehicle the combination with wings or aeroplanes of upper and lower longitudinal passages having enlarged open ends, means for projecting a power fluid through said passages to propel the vessel, and means for varying the relative flow of said fluid through the passages so as to control the inclination of the vessel.

12. In a vessel or vehicle the combination with wings or aeroplanes of upper and lower longitudinal passages having enlarged open ends, means for projecting a power fluid through said passages to propel the vessel, and automatic means for varying the relative flow of said fluid through the passages so as to control the inclination of the vessel.

13. The combination with an aerial vessel of wings or aeroplanes provided with centrally contracted longitudinal passages therethrough and means for projecting a power fluid through said passages to draw air therethrough, said fluid being applied within the passages and forward of their contracted portions.

14. The combination with an aerial vessel of laterally extending wings or aeroplanes provided with centrally contracted longitudinal passages therethrough and means for projecting a power fluid through said passages to draw air therethrough, said fluid being applied within the passages and forward of their contracted portions, and means for steering the vessel by varying the flow of said fluid on opposite sides thereof.

15. The combination with an aerial vessel of laterally extending wings or aeroplanes, each wing being formed of upper and lower planes forming a longitudinal passage through the wing and having slant openings connecting with said passage from above and below the wing.

16. The combination with an aerial vessel of laterally extending wings or aeroplanes, each wing being formed of upper and lower planes forming a passage through the wing and having closable slant openings connecting with said passage from above and below the wing.

17. The combination with an aerial vessel of laterally extending wings or aeroplanes having longitudinal passages therethrough and a series of pivoted leaves forming slant openings between said passages and the upper and lower sides of the wings, means being provided for operating the pivoted leaves.

18. The combination with an aerial vessel of laterally extending wings or aeroplanes having longitudinal passages therethrough and a series of pivoted leaves forming slant openings between said passages and the upper and lower sides of the wings, automatic means being provided for operating the pivoted leaves.

19. The combination with an aerial vessel of laterally extending wings or aeroplanes having longitudinal passages therethrough and a series of pivoted leaves forming slant openings between said passages and the upper and lower sides of the wings, automatic means being provided for operating the pivoted leaves and said means comprising cords or wires attached to said leaves and to a pendulum whereby the leaves are opened and closed by variations in the vessel's lateral trim.

20. In an aerial vessel the combination of upper and lower longitudinal air passages and substantially vertical air passages, said vertical passages connecting at their lower ends with the lower longitudinal passage and said lower passage being provided with apertures in its bottom beneath said vertical passages.

21. In an aerial vessel the combination of upper and lower longitudinal air passages and substantially vertical air passages, said vertical passages connecting at their lower ends with the lower longitudnal passage and said lower passage being provided with apertures in its bottom beneath said vertical passages and with means for opening and closing said apertures.

22. In an aerial vessel the combination of upper and lower longitudinal air passages and substantially vertical air passages, said vertical passages connecting at their lower ends with the lower longitudinal passage and said lower passage being provided with apertures in its bottom beneath said vertical passages and with means for opening and closing said vertical passages, said means comprising hinged aprons and screw mechanism for raising and lowering said aprons.

23. In an aerial vessel the combination with a longitudinal passage having hinged aprons closing apertures in its under side, of wheels on said aprons and means for raising and lowering the wheels.

24. In an aerial vessel the combination with a longitudinal passage having hinged aprons closing apertures in its under side, of wheels on said aprons and means for raising and lowering the wheels, said means comprising screw mechanisms having spring cushions substantially as and for the purpose described.

25. In a vessel or vehicle the combination of upper and lower longitudinal air passages, means for generating a power fluid, projectors for discharging the fluid through said passages, and means for varying the flow of fluid from the projectors, said means comprising branch pipes leading to the projectors and a three-way valve at the intersection of said pipes.

26. In a vessel or vehicle the combination of upper and lower longitudinal air passages, means for generating a power fluid, projectors for discharging the fluid through said passages, and automatic means for varying the flow of fluid from the projectors.

27. In a vessel or vehicle the combination of upper and lower longitudinal air passages, means for generating a power fluid, projectors for discharging the fluid through said passages, and automatic means for varying the flow of fluid from the projectors, said means comprising branch pipes leading to the projectors, a three-way valve at the intersection of said pipes and a pendulum lever for operating the valve.

28. The combination with a vessel or vehicle of a flexibly connected under body forming an air passage and means for inducing a current of atmosphere therethrough to propel the vessel and to form a pneumatic cushion for its upper portion.

29. The combination with a vessel or vehicle of a flexibly connected under body forming an air passage and means for inducing a current of atmosphere therethrough to propel the vessel and to form a pneumatic cushion for its upper portion, said means comprising a generator, a pipe leading therefrom to the passage, and a nozzle or projector on said pipe for discharging a power fluid in said passage.

30. In a vessel or vehicle propelled by a power fluid applied impulsively to air flowing through a passage, the combination of multiple propelling devices and means for steering the vessel by varying the relative power applied through the several propelling devices.

CHRISTOPHER JOHN LAKE,
(FORMERLY JOHN CHRISTOPHER LAKE.)

Witnesses:
A. E. ADAM,
A. R. NEFF.